US012620868B2

(12) United States Patent
Penne et al.

(10) Patent No.: US 12,620,868 B2
(45) Date of Patent: May 5, 2026

(54) TRANSVERSE PSEUDO DIRECT DRIVE

(71) Applicant: NUtech Ventures, Inc., Lincoln, NE (US)

(72) Inventors: Matthew Penne, Lincoln, NE (US); Liyan Qu, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 204 days.

(21) Appl. No.: 18/492,323

(22) Filed: Oct. 23, 2023

(65) Prior Publication Data

US 2024/0136888 A1    Apr. 25, 2024
US 2024/0235323 A9    Jul. 11, 2024

Related U.S. Application Data

(60) Provisional application No. 63/380,800, filed on Oct. 25, 2022.

(51) Int. Cl.
*H02K 7/116*      (2006.01)
*H02K 7/18*      (2006.01)

(52) U.S. Cl.
CPC ............. *H02K 7/116* (2013.01); *H02K 7/183* (2013.01)

(58) Field of Classification Search
CPC ........ H02K 49/102; H02K 7/11; H02K 7/116; H02K 7/183; H02K 7/1838
See application file for complete search history.

(56) References Cited

U.S. PATENT DOCUMENTS

2007/0108850 A1*   5/2007   Chertok ................. H02K 33/16
                                            310/15
2011/0042965 A1*   2/2011   Atallah ................. H02K 51/00
                                            290/44

(Continued)

FOREIGN PATENT DOCUMENTS

GB          2439111 B      6/2006

OTHER PUBLICATIONS

K. Attalah et al., "A Novel High-Performance Magnetic Gear" *IEEE Transactions on Magnetics*, vol. 37, No. 4 (2001).

(Continued)

*Primary Examiner* — Naishadh N Desai
(74) *Attorney, Agent, or Firm* — Gerald T. Gray; Leydig, Voit & Mayer, LTD.

(57) ABSTRACT

A magnetic gear assembly includes a first magnet ring comprising first magnetic pole-pairs disposed evenly along the first magnet ring, a second magnet ring comprising second magnetic pole-pairs disposed evenly along the second magnet ring, a third magnet ring comprising third magnetic pole-pairs disposed evenly along the third magnet ring, wherein each of the first magnetic pole-pairs, the second magnetic pole-pairs, and the third magnetic pole-pairs comprises two opposing magnets, and a fourth ring comprising ferromagnetic pieces disposed evenly along the fourth ring. The first, second, third, and fourth magnet rings are arranged along an axis, wherein the first and the second magnet rings are positioned on either side of the third magnet ring along the axis, and wherein magnetic flux generated by the third magnet ring is distributed between the first and the second magnet rings during operation of the magnetic gear assembly.

20 Claims, 6 Drawing Sheets

(56) References Cited

U.S. PATENT DOCUMENTS

| | | | | |
|---|---|---|---|---|
| 2015/0018168 A1* | 1/2015 | Davey | | H02K 49/102 |
| | | | | 476/11 |
| 2016/0049855 A1* | 2/2016 | Davey | | H02K 7/11 |
| | | | | 175/170 |
| 2017/0005560 A1 | 1/2017 | Bird | | |
| 2019/0199190 A1* | 6/2019 | Valentini | | B25F 5/001 |
| 2019/0203832 A1* | 7/2019 | Heo | | F16H 61/24 |

OTHER PUBLICATIONS

X. Yin et al., "A Novel Magnetic Gear: Toward a Higher Torque Density" in *IEEE Transactions on Magnetics*, vol. 51, No. 11. pp. 1-4, (2015).

K. Attalah et al., "A Novel Pseudo Direct-Drive Brushless Permanent Magnet Machine" IEEE Trans. on Magnetics, vol. 44, No. 11, pp. 4349-4352, (2008).

Y. Chen et al., "A Quantitative Comparison Analysis of Radial-Flux, Transverse-Flux, and Axial-Flux Magnetic Gears" IEEE Trans. on Magnetics, vol. 50, No. 11, pp. 1-4, (2014).

K. Li et al., "A Review of the Volumetric Torque Density of Rotary Magnetic Gear Designs" in *Proc. XIII International Conference on Electrical Machines (ICEM)*, pp. 2016-2022, (2018).

Q. Wang et al., "A Vernier Pseudo-Direct-Drive Permanent-Magnet Machine" *XIII International Conference on Electrical Machines (ICEM)*, pp. 2023-2029, (2018).

M.B. Kouhshahi et al., "An Axial Flux Focusing Magnetically Geared Generator for Low Input Speed Applications" *IEEE Trans. on Industry Applications*, vol. 56, No. 1, pp. 138-147, (2020).

S. Geber et al., "Design and Evaluation of a Magnetically Geared PM Machine", in *IEEE Transactions on Magnetics*, vol. 51. No 8. pp. 1-10, (2015).

C.G.C. Neves et al., "Design of a Pseudo Direct Drive for Wind Power Applications" *International Conference of Asian Union of Magnetics Societies (ICAUMS)*, pp. 1-5, (2016).

P.O. Rasmussen et al., "Development of a High-Performance Magnetic Gear" in *IEEE Transactions on Industry Applications*, vol. 41, No. 3, pp. 764-770, (2005).

M. Desvaux et al., "Experimental validation of a transverse flux magnetic gear" *Journal of Magnetism and Magnetic Materials* (2021).

X. Li et al., "Investigation of the Flux Leakage Effects in Transverse-Flux Magnetic Gear" *20th International Conference on Electrical Machines and Systems (ICEMS)*, pp. 1-5, (2017).

M. Bouheraoua et al., "Speed Control for a Pseudo Direct Drive Permanent Magnet Machine with One Position Sensor on Low-speed Rotor", *IEEE Trans. on Industry Applications*, vol. 50, No. 6, pp. 3825-3833, (2014).

W. Bomela et al., "The Performance of a Transverse Flux Magnetic Gear" *IEEE Trans. on Magnetics*, vol. 50, No. 1, pp. 1-4, (2014).

* cited by examiner

FIG. 2B: Simulation results

Low-Speed Rotor 49 mm 0.5 mm 4 mm 24 mm 5 mm 20 mm 4 mm

Fixed Magnet Ring

Bottom high-speed rotor

100

110    Low-Speed Rotor: 23 ferromagnetic pieces

120    Fixed Magnet Ring: 21 pole pairs

Rotor Back Iron

130    Bottom High-Speed Rotor: 2 pole pairs

Figures 3A, 3B:
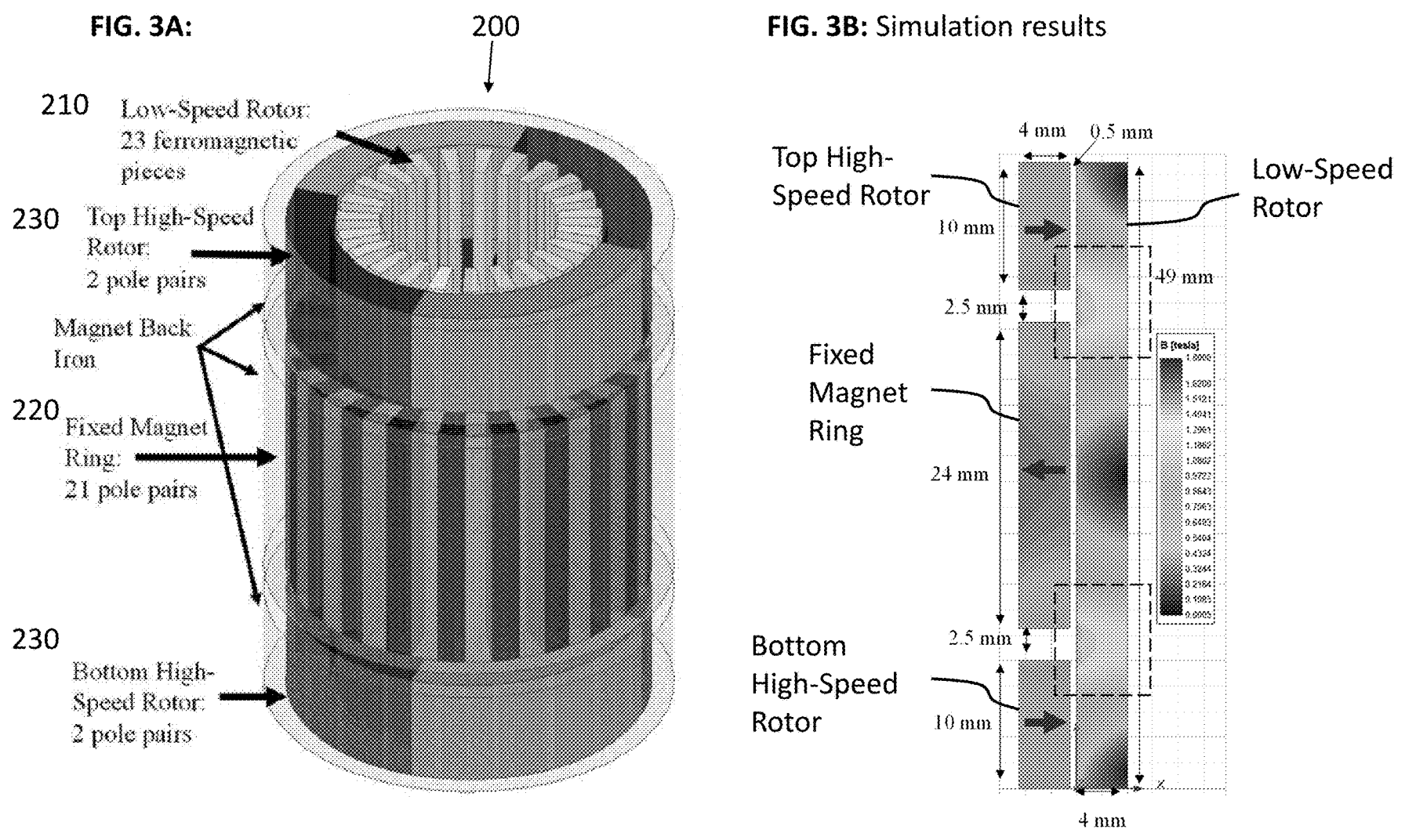

FIG. 3B: Simulation results

210 Low-Speed Rotor: 23 ferromagnetic pieces

230 Top High-Speed Rotor: 2 pole pairs

Magnet Back Iron

220 Fixed Magnet Ring: 21 pole pairs

230 Bottom High-Speed Rotor: 2 pole pairs

300 →

310 Low-Speed Rotor:
19 ferromagnetic
pieces

330 Top Fixed Magnet
Ring:
15 pole pairs

Magnet Back
Iron

320 High-Speed
Rotor:
4 pole pairs

330 Bottom Fixed
Magnet Ring:
15 pole pairs

400

450 Stator

420 High-Speed Rotor

430 Fixed Magnet Ring

Fixed Magnet Ring 430

Low-Speed Rotor 410

TRANSVERSE PSEUDO DIRECT DRIVE

CROSS-REFERENCE TO RELATED APPLICATION

This application claims priority to U.S. Provisional Patent Application No. 63/380,800, filed Oct. 25, 2022, titled "TRANSVERSE PSEUDO DIRECT DRIVE," which is incorporated herein by reference in its entirety.

BACKGROUND

The present disclosure provides magnetic gears, and in particular symmetric transverse-flux magnetic gears, useful in direct drive systems.

The first pseudo direct drive (PDD) was proposed in K. Atallah, J. Rens, S. Mezani, and D. Howe, "A novel "pseudo" direct-drive brushless permanent magnet machine," IEEE Trans. on Magnetics, vol. 44, no. 11, pp. 4349-4352, November 2008 (hereinafter "Atallah-1"), which combined the coaxial radial-flux magnetic gear proposed in K. Atallah and D. Howe, "A novel high-performance magnetic gear," IEEE Trans. on Magnetics, vol. 37, no. 4, pp. 2844-2846, July 2001, and a permanent magnet brushless machine. Coaxial magnetic gears are a method of torque transfer between two shafts rotating at different speeds. They are attractive over conventional mechanical gears because the rotating shafts have no mechanical connection and all torque is transferred magnetically. This results in less wear from friction, increased efficiency, increased reliability, and inherent overload protection [See, e.g., Y. Chen, W. N. Fu, S. L. Ho, and H. Liu, "A quantitative comparison analysis of radial-flux, transverse-flux, and axial-flux magnetic gears," IEEE Trans. on Magnetics, vol. 50, no. 11, pp. 1-4, November 2014; K. Li and J. Z. Bird, "A review of the volumetric torque density of rotary magnetic gear designs," in Proc. XIII International Conference on Electrical Machines (ICEM), October 2018, pp. 2016-2022; and C. G. C. Neves, A. F. Flores Filho, and D. G. Dorrel, "Design of a pseudo direct drive for wind power applications," International Conference of Asian Union of Magnetics Societies (ICAUMS), pp. 1-5, August 2016]. This technology is extremely promising for wind energy, especially offshore wind energy, where maintaining or replacing the wind turbines' gearbox is prohibitively expensive.

Coaxial magnetic gears can be as compact and cost effective as mechanical gears for a given application, but a stator can be incorporated in the design to produce a compact, low-cost electric machine. For low-speed applications, PDDs show promise over mechanically geared counterparts. They are estimated to have reduced size, weight, and cost over a mechanically geared high speed permanent magnet synchronous machine (PMSM) or a large direct drive PMSM [see, e.g., M. Bouheraoua, J. Wang, and K. Atallah, "Speed control for a pseudo direct drive permanent-magnet machine with one position sensor on low-speed rotor," IEEE Trans. on Industry Applications, vol. 50, no. 6, pp. 3825-3833, November-December 2014]. In Atallah-1, the PDD design employs a radial-flux magnetic gear, with a stationary high pole-pair magnet ring on the outside, a high-speed low pole-pair magnet rotor spinning freely in the middle, and low-speed output/input rotor with ferromagnetic pole pieces rotating between the two magnet rings. A stator is affixed outside the high pole-pair magnetic ring, and the rotating magnetic field generated by the stator winding couples with the inner high-speed rotor to produce an electromagnetic torque. This electromagnetic torque couples with the ferromagnetic pole pieces in the low-speed rotor to induce a low-speed high torque output for motors or input for generators. This results in a compact low speed machine capable of handling large torques [see, Atallah-1]. Speed control of a PDD was derived in M. B. Kouhshahi et al., "An axial flux focusing magnetically geared generator for low input speed applications," IEEE Trans. on Industry Applications, vol. 56, no. 1, pp. 138-147, January-February 2020. Problems with this design include the difficulty to cool the inner high-speed rotor and the fact that the high-speed rotor and the low-speed rotor need to be constructed with a bearing mechanically attaching the two. An alternative to the conventional radial-flux PDD is an axial-flux pseudo direct drive as in W. Bomela, J. Z. Bird, and V. M. Acharya, "The performance of a transverse flux magnetic gear," IEEE Trans. on Magnetics, vol. 50, no. 1, pp. 1-4, January 2014. The axial-flux PDD uses a radial-flux stator to rotate the high-speed, low pole-pair magnet rotor directly. The magnet ring with high pole-pairs is stationary and placed axially to the high-speed rotor. A ring of steel pieces commutates the flux between the two rings of magnets and operates as the low-speed rotor. This design offers higher torque density than the radial-flux PDD, but at the cost of being mechanically complex, and a low-speed rotor that has high eddy current losses and can be difficult to manage heat.

Thus, there is a need for developing techniques for use, among other applications, in low-speed pseudo direct drive applications.

SUMMARY

The systems and methods according to the present embodiments provide magnetic gears, including symmetric transverse-flux magnetic gears, useful in direct drive systems.

According to an embodiment, a magnetic gear assembly is provided that includes a plurality of magnet rings. The plurality of magnet rings includes a first magnet ring, a second magnet ring, a third magnet ring, and a fourth ring. The first magnet ring includes first magnetic pole-pairs disposed evenly along the first magnet ring. The second magnet ring includes second magnetic pole-pairs disposed evenly along the second magnet ring. The third magnet ring includes third magnetic pole-pairs disposed evenly along the third magnet ring. Each of the first magnetic pole-pairs, the second magnetic pole-pairs, and the third magnetic pole-pairs includes two opposing magnets. The fourth ring includes ferromagnetic pieces disposed evenly along the fourth ring. The first magnet ring, the second magnet ring, the third magnet ring, and the fourth ring are arranged along an axis. The first magnet ring and the second magnet ring are positioned on either side of the third magnet ring along the axis. Magnetic flux generated by the third magnet ring is distributed between the first magnet ring and the second magnet ring during operation of the magnetic gear assembly.

According to an embodiment, the number of the first magnetic pole-pairs is the same as the number of the second magnetic pole-pairs. The number of third magnetic pole-pairs differs from the number of the first magnetic pole-pairs and the number of the second magnetic pole-pairs.

According to an embodiment, the number of the ferromagnetic pieces are determined based on the number of the first magnetic pole-pairs and the number of the third magnetic pole-pairs.

According to an embodiment, the third magnet ring and the fourth ring are arranged coaxially with respect to the axis, and the fourth ring is greater in axial length than the third magnet ring.

According to an embodiment, the axial length of the fourth ring is the sum of the axial lengths of the first magnet ring, the second magnet ring, the third magnet ring, a first air gap between the first magnet ring and the third magnet ring, and a second air gap between the second magnet ring and the third magnet ring.

According to an embodiment, the number of the first magnetic pole-pairs is greater than the number of the third magnetic pole-pairs.

According to an embodiment, the number of the first magnetic pole-pairs is smaller than the number of the third magnetic pole-pairs.

According to an embodiment, the ferromagnetic pieces in the fourth ring are made of ferromagnetic composites.

According to an embodiment, the first magnet ring and the second magnet ring are fixed with respect to the axis.

According to an embodiment, the magnetic gear assembly is assembled in an electrical generator. A plurality of stator windings are affixed outside the third magnet ring.

According to an embodiment, the third magnet ring is fixed with respect to the axis.

According to an embodiment, the magnetic gear assembly is assembled in an electrical generator. A plurality of stator windings are affixed outside the first magnet ring or the second magnet ring.

According to an embodiment, the magnetic gear assembly is assembled in a wind turbine. The fourth ring is connected to one end of a shaft in the wind turbine, and the other end of the shaft is connected to rotor blades of the wind turbine.

According to an embodiment, the magnetic gear assembly further includes a fifth magnetic ring and a sixth magnetic ring. The fifth magnetic ring includes fifth magnetic pole-pairs disposed evenly along the fifth magnet ring. The sixth magnetic ring includes sixth magnetic pole-pairs disposed evenly along the sixth magnet ring. Each of the fifth magnetic pole-pairs and the sixth magnetic pole-pairs includes two opposing magnets. The number of the fifth magnetic pole-pairs is the same as the number of the third magnetic pole-pairs, and the number of the sixth magnetic pole-pairs is the same as the number of the second magnetic pole-pairs. The magnetic rings are arranged in an alternating manner according to the number of magnetic pole-pairs comprised in the respective magnet rings.

According to an embodiment, the magnetic gear assembly is assembled in a motor.

According to an embodiment, a wind turbine includes a magnetic gear assembly as described herein, wherein the fourth ring is connected to one end of a shaft in the wind turbine, and the other end of the shaft is connected to rotor blades of the wind turbine.

According to an embodiment, an electrical generator includes a magnetic gear assembly as described herein, wherein the first magnet ring and the second magnet ring are fixed with respect to the axis, and wherein a plurality of stator windings are affixed outside the third magnet ring.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWINGS

The detailed description is described with reference to the accompanying figures. The use of the same reference numbers in different instances in the description and the figures may indicate similar or identical items.

FIG. 2B shows simulation results of magnetic flux density in cross section of the magnetic gear as shown in FIG. 2A FIG. 3A demonstrates an embodiment of a symmetric transverse-flux coaxial magnetic gear (STCMG).

FIG. 3B shows simulation results of magnetic flux density in cross section of the magnetic gear as shown in FIG. 3A.

DETAILED DESCRIPTION

The following detailed description is exemplary in nature and is not intended to limit the invention or the application and uses of the invention. Furthermore, there is no intention to be bound by any expressed or implied theory presented in the following detailed description or the appended drawings.

Turning to the drawings, and as described in detail herein, embodiments of the disclosure provide magnetic gears, and in particular symmetric transverse-flux magnetic gears, useful in direct drive systems.

Magnetic gears are the contactless mechanisms for torque-speed conversion using permanent magnets or electromagnets. A typical magnetic gear consists of three rotors, each with a different number of magnetic pole-pairs or ferromagnetic poles separated by a small air gap. The ferromagnetic poles (e.g., middle rotor) modulate the magnetic fields produced by inner and outer rotors and create space harmonics in the air gaps. The magnetic fields modulated via the ferromagnetic poles interact with the magnetic field on the other side to transmit the torque.

The modulation of the magnetic field is related to eddy currents generated in the ferromagnetic materials, which are loops of electrical current induced within conductors by a changing magnetic field in the conductor according to Faraday's law of induction. Eddy currents flow in closed loops within conductors, in planes perpendicular to the magnetic field.

Based on their operations, magnetic gears can be classified into three types: linear magnetic gears (LMGs), coaxial magnetic gears (CMGs), and axial magnetic gears (AMGs). For LMGs and CMGs, the magnetic flux is typically generated radially inward or outward with reference to the shaft axis. For AMGs, magnetic flux lines are created parallel to the rotor axis. Transverse-flux CMGs are a special case of the CMGs in which the rotors with magnetic pole-pairs are arranged side-by-side along the axis, while the rotors with magnetic pole-pairs and the rotor with ferromagnetic poles are arranged coaxially.

Figure 1:
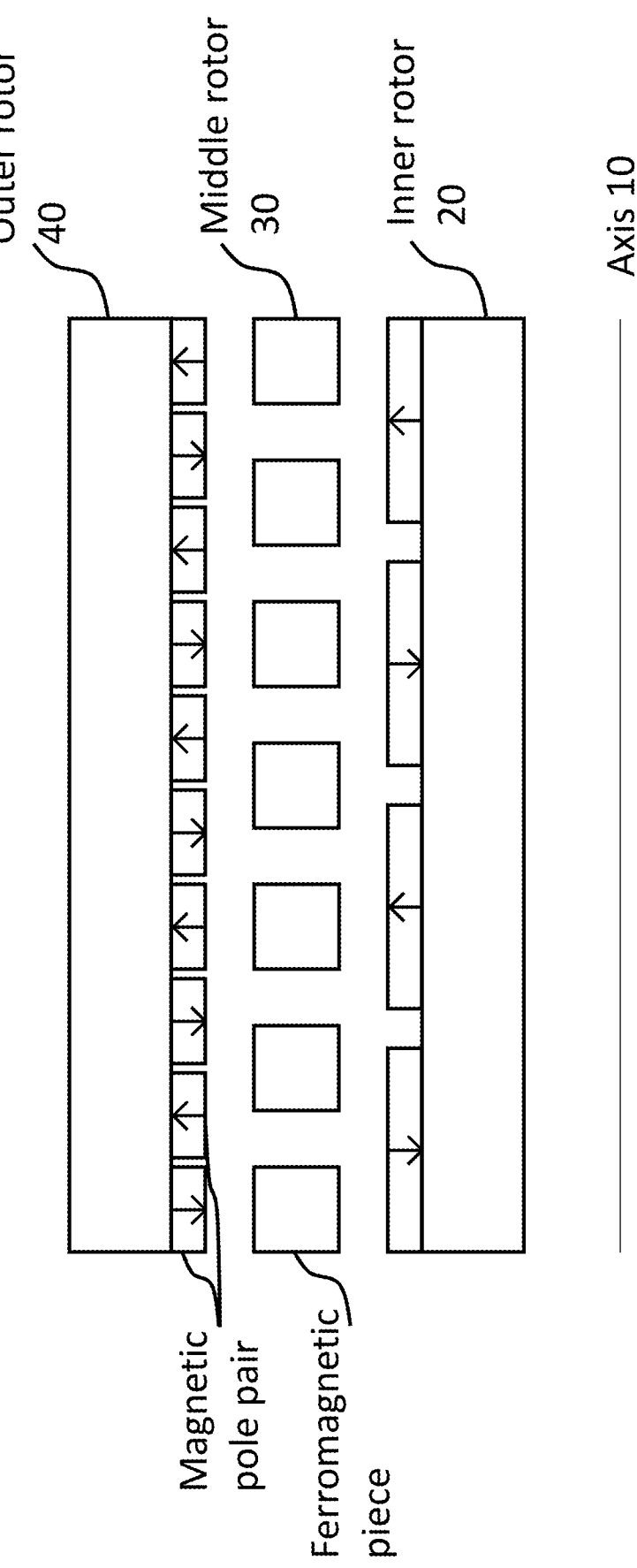
FIG. 1 is a schematic of a typical magnetic gear to demonstrate the working principle thereof.

FIG. 1 is a schematic of a typical magnetic gear to demonstrate the working principle thereof. In this example, the magnetic gear adopts the LMG configuration. However, the demonstrated working principle is the same for rotating magnetic gears, e.g., CMGs and AMGs.

As shown in FIG. 1, the magnetic gear includes three rotors, which are inner rotor 20, middle rotor 30, and outer rotor 40 in order from the axis 10 outward. The specific magnetic gear shown includes two magnetic pole pairs on the inner rotor 20, seven ferromagnetic poles on the middle rotor 30, and five magnetic pole pairs on the outer rotor 40. The pole pairs on the inner and outer rotors may be denoted as $P_i$ and $P_o$, respectively. The poles on the middle rotor 30 may be denoted as n.

The two pole pairs on the inner rotor 20 produce the magnetic field with a dominant second harmonic. This field is then modulated by the seven ferromagnetic poles of the middle rotor 30 to generate a field with a dominant fifth harmonic. The modulated field interacts with the dominant fifth harmonic field that is produced by the outer rotor 40 to transfer torque to the outer rotor 40. This generates the torque, as the field harmonic component from the outer rotor 40 matches with the harmonic component created by the modulated inner rotor field.

In order to attain the highest torque density, the number of pole pairs on each of the rotors should satisfy the following relation:

$$P_0 = n - P_i. \qquad \text{(Eq. 1)}$$

The relation between the pole pairs and the angular speed for all three rotors for maximum torque transmission is given by:

$$\omega_i = \frac{n}{n - P_o}\omega_n - \frac{P_o}{n - P_o}\omega_o, \qquad \text{(Eq. 2)}$$

where $\omega_i$, $\omega_o$, and $\omega_n$ denote the angular speed for the inner rotor 20, outer rotor 40, and middle rotor 30, respectively. One of the three rotors may be kept stationary, leading to a simplified relation between the other two rotors. When the middle rotor 30 is stationary, the relation between the inner and outer rotors is given by:

$$\omega_o = -\frac{P_i}{P_o}\omega_i, \qquad \text{(Eq. 3a)}$$

where the negative sign indicates the outer and inner rotors move in opposite directions. When the inner rotor 20 is stationary, the relation between the middle and outer rotors is given by:

$$\omega_o = \frac{P_o}{n}\omega_n. \qquad \text{(Eq. 3b)}$$

When the outer rotor 40 is stationary, the relation between the middle and inner rotors is given by:

$$\omega_i = \frac{n}{P_i}\omega_n. \qquad \text{(Eq. 3c)}$$

Transverse-flux magnetic gears are widely used in renewable energy applications, such as in windmill power generation. However, traditional transverse-flux magnetic gears suffer from a lower torque density, which can be attributed to the saturation of the ferromagnetic rotor near intersection of the rings of magnets on the magnetic rotors.

Figure 2A:
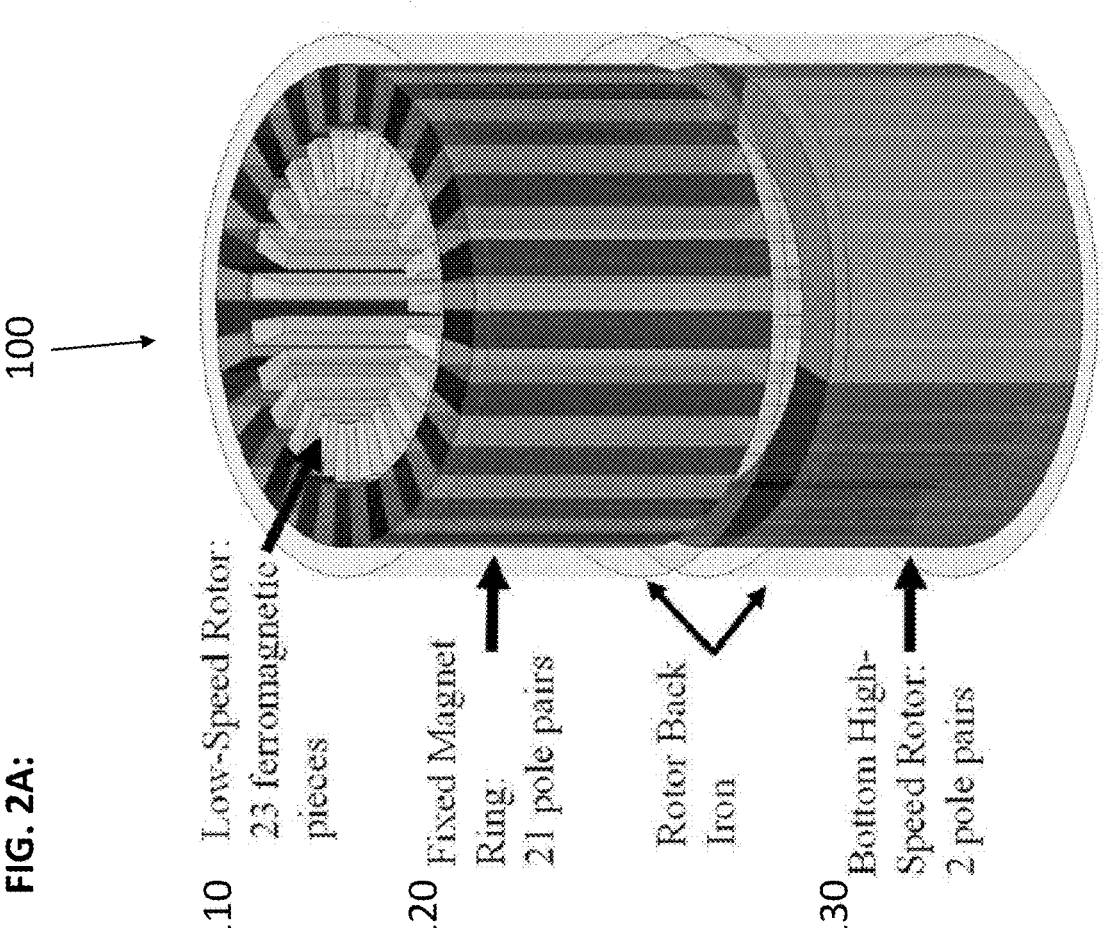
FIG. 2A illustrates a conventional transverse-flux CMG with an exemplary configuration, according to an example embodiment.

FIG. 2A illustrates a conventional transverse-flux CMG 100 with an exemplary configuration. In this configuration, the low-speed rotor 110 includes 23 ferromagnetic pieces (i.e., the ferromagnetic poles), i.e., n=23. The ring 120 with high-density magnets includes 21 magnetic pole pairs, i.e., $P_o$=21. The rotor 130 with low-density magnets includes two magnetic pole pairs, i.e., $P_i$=2. The ring 120 with high-density magnets is fixed or stationary, therefore, the speed relation between the rotor 110 with ferromagnetic pieces and the rotor 130 with low-density magnets can be computed by applying Equation 3c, that is $$\omega_i = \frac{n - P_i}{P_i}\omega_n = 10.5\omega_n.$$

FIG. 2B shows simulation results of magnetic flux density in a cross section of the magnetic gear 100 as shown in FIG. 2A. As shown in FIG. 2B, the area where the fixed magnet ring 120 and the high-speed rotor 130 intersect causes a large flux density magnitude in the corresponding ferromagnetic piece, which is marked with dashed box. The arrows indicate the orientation of the magnetic flux. In this example, the magnetic material is N42 with the ferromagnetic material being steel 1010. Table I lists certain parameters in the conventional transverse magnetic gear.

TABLE I

| Conventional transverse magnetic gear parameters. | | |
|---|---|---|
| High-Speed Rotor Air Gap | Axial length Axial Air Gap | 20 millimeters (mm) 5.0 mm |

The amount of magnetic field force that can be applied to a ferromagnetic material has an upper limit, which means the magnetic flux will reach magnetic saturation. When the magnetic flux is saturated in the marked region, excessive magnetic flux will be converted into other types of energy (such as heat), resulting in a decrease in the energy conversion rate.

This present disclosure provides symmetric transverse-flux coaxial magnetic gears (STCMGs) to increase the torque density, thereby advantageously improving the performance of a transverse-flux CMG. The STCMGs of the present disclosure reduce the flux density magnitude in the ferromagnetic rotor (or ferromagnetic ring if designed to be stationary), allowing the STCMGs to be more compact than the conventional transverse-flux magnetic gears. In some examples, the STCMG is used to build a symmetric transverse-flux pseudo direct drive (STPDD), thereby providing a potential option for low-speed pseudo direct drive applications. There are several benefits to introducing a stator to the STCMG, which is one difference between the magnetic gear and the STPDD. The stator couples directly with the high-speed rotor, which in turn drives the low-speed rotor. Additionally, the high-speed rotors are not mechanically connected to the low-speed rotor with a bearing, further increasing the robustness of the design.

FIG. 3A demonstrates a STCMG device 200 according to an embodiment. This configuration is similar to the configuration of the conventional transverse-flux CMG 100 as shown in FIG. 2A for direct comparison. A difference is that this configuration includes two identical high-speed rotors 230 placed on top and bottom of the fixed magnet ring 220 to form a symmetrical structure. Similarly, the ring 220 with high-density magnets is stationary, therefore, the speed relation between the rotor 210 with ferromagnetic pieces and each rotor 230 with low-density magnets can be computed by applying Equation 3c, that is $$\omega_i = \frac{n - P_i}{P_i}\omega_n = 10.5\omega_n.$$

such, the top and bottom high-speed rotors 230 may be rotating at the same speed. Based on this configuration, magnetic flux from the fixed magnet ring 220 may be distributed between the two high-speed rotors 230 during operation of the STCMG 200.

FIG. 3B shows simulation results of magnetic flux density in a cross section of the magnetic gear 200 as shown in FIG. 3A. As shown in FIG. 3B, the areas where the fixed magnet rings 220 and the high-speed rotors 230 intersect are marked with dashed boxes. The arrows indicate the orientation of the magnetic flux. Further, in FIG. 3B, the cross section of the STCMG 200 shows the same amount of magnetic and ferromagnetic materials as the conventional transverse-flux CMG 100 in FIG. 2B. Comparing to the conventional transverse-flux CMG 100, the STCMG 200 has much lower magnetic flux density magnitude in the ferromagnetic piece as shown in the dashed boxes between the alternative rings of magnets. As a result, the magnetic flux can be utilized more efficiently, thus allowing for a more compact design of the STCMG with a similar magnitude of magnetic flux density to conventional transverse design. Table II lists a number of parameters and materials in the specific STCMG as shown in FIG. 3A. It should be understood that this is but an example and that the parameters can vary significantly depending, e.g., on the specific device application.

TABLE II

| STCMG parameters and materials. | | |
|---|---|---|
| Low- | Ferromagnetic pieces | 21 |
| Speed | Axial length | 49 mm |
| Rotor | Radial thickness | 4 mm |
| | Piece Angular Span | 8 degrees |
| | Inside Diameter | 16 mm |
| High- | Pole-pairs | 2 |
| Speed | Axial length | 10 mm |
| Rotors | Radial thickness | 4 mm |
| (for | Magnet Angular Span | 45 degrees |
| individual) | Back Iron Thickness | 2 mm |
| Fixed | Pole-pairs | 21 |
| Magnet | Axial length | 24 mm |
| Ring | Radial thickness | 4 mm |
| | Magnet Angular Span | 8.57 degrees |
| | Back Iron Thickness | 2 mm |
| Air | Radial Air Gap | 0.5 mm |
| Gaps | Axial Air Gap | 2.5 mm |
| Material | Carbon Steel | Steel 1010 |
| | Neodymium Magnet | N42 |

The high-speed rotor(s) and fixed magnet rings in the examples in each may include a piece of back iron to accommodate the magnet pole-pairs. The magnet pole-pairs may be evenly distributed on the respective rotor/ring. The ferromagnetic pieces may also be evenly distributed on the respective rotor/ring.

In some examples, the ferromagnetic pieces in a fixed ring or a rotor may be made of ferromagnetic composites, which may include iron, cobalt, nickel, and some alloys or compounds containing one or more of these elements. The ferromagnetic pieces used in some of the examples in the present disclosure are made of steel, which are not intended for limiting the scope of the present disclosure.

It will be appreciated by an ordinary person skilled in the art that the configuration of STCMGs is not limited by examples of the present disclosure. For instance, the dimension (e.g., the length, width, depth) of each ring/rotor in STCMGs may be of various values suitable for different practical applications. The number of magnetic pole pairs or the ferromagnetic poles may also be of various values. Some or none of the rings/rotors in STCMGs may be configured as stationary. For example, in some embodiments, the number of the magnetic pole-pairs of the rotors 230 is the same (although they may be different), and the number of magnetic pole-pairs of ring 220 differs from the number of the magnetic pole-pairs of the rotors 230. In some embodiments, the number of the ferromagnetic pieces of rotor 210 are determined based on the number of the magnetic pole-pairs of rotor(s) 230 and the number of the magnetic pole-pairs of ring 220. In some embodiments, the number of the magnetic pole-pairs of each rotor 230 is greater than the number of the magnetic pole-pairs of ring 220. In some embodiments, the number of the magnetic pole-pairs of each rotor 230 is smaller than the number of the magnetic pole-pairs of ring 220.

In some embodiments, the magnet ring 220 and the ring 210 are arranged coaxially with respect to the axis, and the ring 210 is greater in axial length than the magnet ring 220. In some embodiments, the axial length of the ring 210 is equal to the axial lengths of the two rotors 230, the magnet ring 220, a first air gap between the (top) magnet ring 230 and the magnet ring 220, and a second air gap between the (bottom) magnet ring 230 and the magnet ring 220, but the axial length of ring 210 may be greater or smaller than that combined length.

Figure 4:
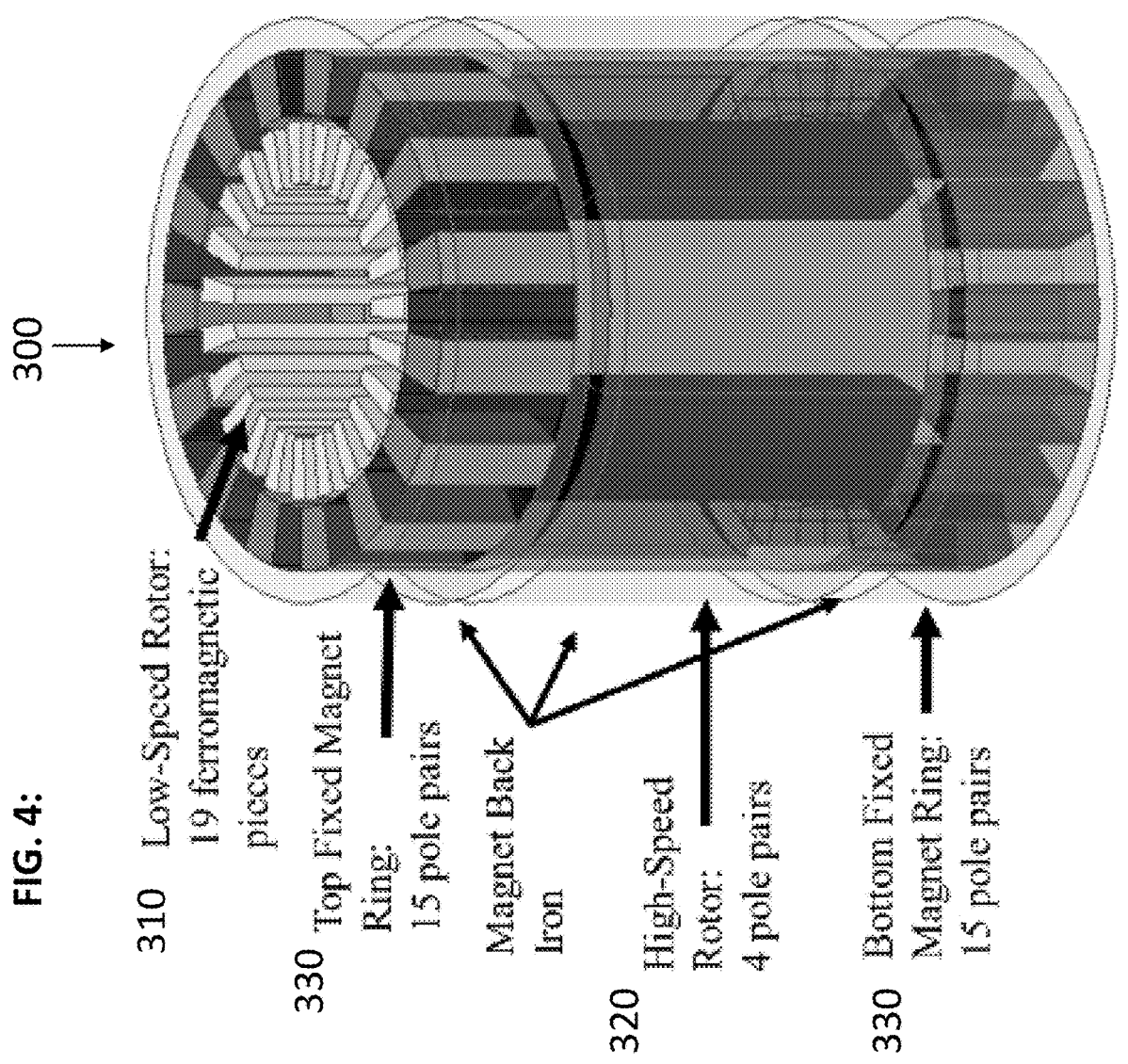
FIG. 4 shows another STCMG embodiment.

FIG. 4 shows a STCMG 300 according to another embodiment. In this configuration, the low-speed rotor 310 includes 19 ferromagnetic pieces, i.e., n=19. The top and bottom fixed magnet rings 330 have the same dimension and include the same number of magnetic pole pairs. In this example, the number of magnetic pole pairs on each of the fixed magnet rings is 21, i.e., $P_o$=21, and the rotor 320 with low-density magnets, i.e., the high-speed rotor, includes four magnetic pole pairs, i.e., $P_i$=4. Since the rotors 330 with high-density magnets are stationary, the speed relation between the rotor with ferromagnetic pieces and the rotor with low-density magnets can be computed by applying Equation 3c, that is $$\omega_i = \frac{n - P_i}{P_i}\omega_n = 3.75\omega_n.$$

According to certain embodiments, STCMGs described in the present disclosure may be modified to be STPDDs. For instance, a stator may be affixed outside at least one high-speed rotor with high-density magnetic pole-pairs.

Figure 5A:
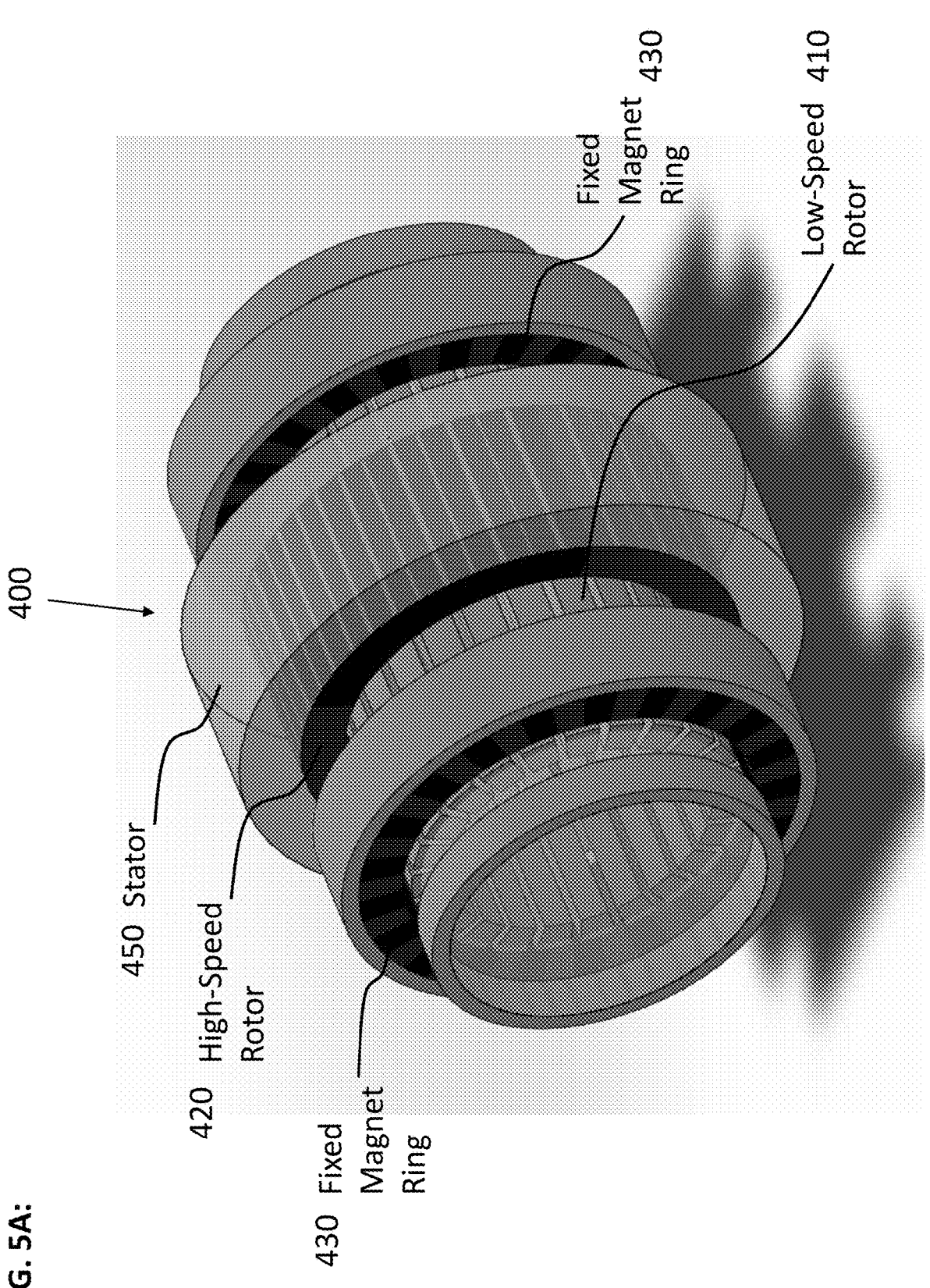
FIG. 5A shows an embodiment of a symmetric transverse-flux pseudo direct drive (STPDD) device based on the STCMG as shown in FIG. 4.

FIG. 5A shows an embodiment of a STPDD device 400 based on the STCMG 300 as shown in FIG. 4. A stator 450 is affixed outside the high-speed rotor 420 with high-density magnetic pole-pairs. As such, rotation of the low-speed rotor 410 with ferromagnetic poles may cause rotation of the high-speed rotor 420, which can interact with the stator 450. The fixed magnet rings 430 and the stator 450 may be fixed together in an embodiment, for easy manufacturing. The stator 450 may include a plurality of stator windings.

Figure 5B:
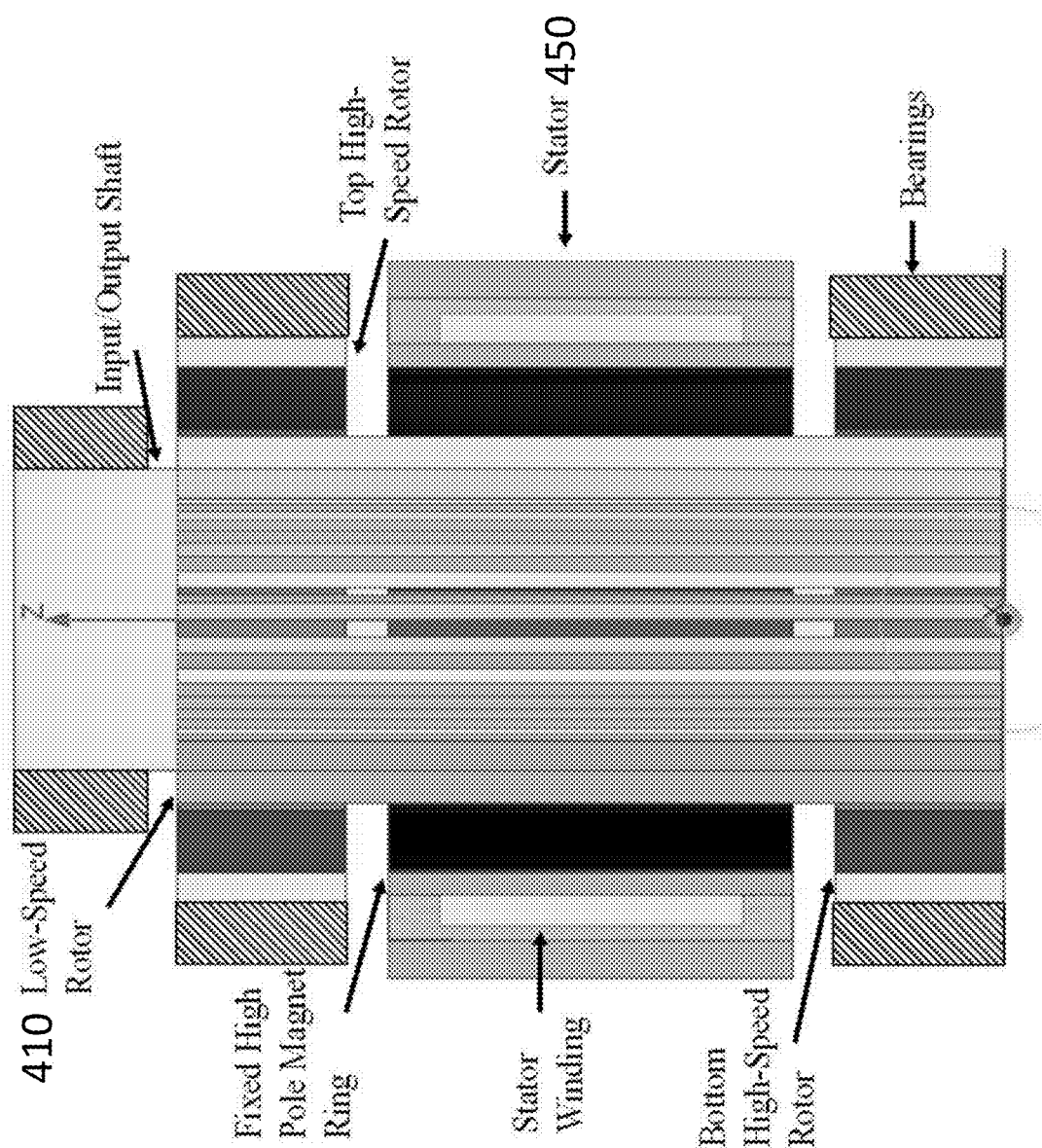
FIG. 5B is a schematic demonstrating the axial cross section of the STPDD device as shown in FIG. 5A.

FIG. 5B is a schematic demonstrating the axial cross section of a STPDD device similar to the STPDD device 400 as shown in FIG. 5A. In this embodiment, the low-speed rotor 410 is connected to the input/output shaft. The input/output shaft is not mechanically connected with a bearing, reducing wear and machine complexity. The high-speed rotor is designed outside the low-speed rotor, allowing for more cooling options. The ferromagnetic (e.g., steel) pieces on the low-speed rotor can be laminated, reducing induced eddy currents and heat concerns. Example stator specifications are given in Table III. It will be appreciated that other parameters/specification may be used

TABLE III

| STPPD Stator Parameters | |
| --- | --- |
| Stator Outer Radius | 23.5 mm |
| Stator Stack Length | 24 mm |
| Stator Slot Span | 18 degrees |
| Stator Slots | 6 |
| Maximum Current Density | 6.4 Amperes (A)/mm$^2$ |

The electrical frequency ($\omega_e$) of the stator is given by:

$$\omega_e = p_t \omega_t. \qquad (Eq. 4)$$

The low-speed rotor and high-speed rotors are rotated according to their gearing with the stator currents corresponding with the electric frequency calculated by Equation 4.

In some examples, an STCMG of the present disclosure may be assembled in an electrical generator or motor, for example, by implementing a design similar to the ones as shown in FIG. 5A and FIG. 5B. When the STCMG as shown in FIG. 3A is assembled in an electrical generator or motor, the stator including the plurality of stator windings may be affixed outside any of the high-speed rotors.

In some embodiments, the STCMG may be assembled in a wind turbine. One rotor in the STCMG may be connected to one end of a shaft in the wind turbine, and the other end of the shaft may be connected to rotor blades of the wind turbine.

In some variations, an STCMG assembly may include multiple high-density (low-speed) magnetic rings/rotors and multiple low-density (high-speed) magnetic rings/rotors. The high-density and low-density magnetic rings/rotors may be alternating along the axis.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A magnetic gear assembly, comprising:
   a first magnet ring comprising first magnetic pole-pairs disposed evenly along the first magnet ring;
   a second magnet ring comprising second magnetic pole-pairs disposed evenly along the second magnet ring;
   a third magnet ring comprising third magnetic pole-pairs disposed evenly along the third magnet ring, wherein each of the first magnetic pole-pairs, the second magnetic pole-pairs, and the third magnetic pole-pairs comprises two opposing magnets; and
   a fourth ring comprising a plurality of ferromagnetic pieces disposed evenly along the fourth ring and separated by gaps,
   wherein the first magnet ring, the second magnet ring, the third magnet ring, and the fourth ring are arranged along an axis,
   wherein the first magnet ring and the second magnet ring are positioned on either side of the third magnet ring along the axis, and
   wherein magnetic flux generated by the third magnet ring is distributed between the first magnet ring and the second magnet ring during operation of the magnetic gear assembly.

2. The magnetic gear assembly according to claim 1, wherein the number of the first magnetic pole-pairs is the same as the number of the second magnetic pole-pairs, and wherein the number of third magnetic pole-pairs differs from the number of the first magnetic pole-pairs and the number of the second magnetic pole-pairs.

3. The magnetic gear assembly according to claim 1, wherein the number of the ferromagnetic pieces are determined based on the number of the first magnetic pole-pairs and the number of the third magnetic pole-pairs.

4. The magnetic gear assembly according to claim 1, wherein the third magnet ring and the fourth ring are arranged coaxially with respect to the axis, and the fourth ring is greater in axial length than the third magnet ring.

5. The magnetic gear assembly according to claim 4, wherein the axial length of the fourth ring is the sum of the axial lengths of the first magnet ring, the second magnet ring, the third magnet ring, a first air gap between the first magnet ring and the third magnet ring, and a second air gap between the second magnet ring and the third magnet ring.

6. The magnetic gear assembly according to claim 1, wherein the number of the first magnetic pole-pairs is greater than the number of the third magnetic pole-pairs.

7. The magnetic gear assembly according to claim 1, wherein the number of the first magnetic pole-pairs is smaller than the number of the third magnetic pole-pairs.

8. The magnetic gear assembly according to claim 1, wherein the ferromagnetic pieces in the fourth ring are made of ferromagnetic composites.

9. The magnetic gear assembly according to claim 1, wherein the first magnet ring and the second magnet ring are fixed with respect to the axis.

10. The magnetic gear assembly according to claim 9, wherein the magnetic gear assembly is assembled in an electrical generator, and wherein a plurality of stator windings are affixed outside the third magnet ring.

11. The magnetic gear assembly according to claim 1, wherein the third magnet ring is fixed with respect to the axis.

12. The magnetic gear assembly according to claim 11, wherein the magnetic gear assembly is assembled in an electrical generator, and wherein a plurality of stator windings are affixed outside the first magnet ring or the second magnet ring.

13. The magnetic gear assembly according to claim 1, wherein the magnetic gear assembly is assembled in a wind turbine, and wherein the fourth ring is connected to one end of a shaft in the wind turbine, and the other end of the shaft is connected to rotor blades of the wind turbine.

14. The magnetic gear assembly according to claim 1, further comprising:

a fifth magnetic ring comprising fifth magnetic pole-pairs disposed evenly along the fifth magnet ring; and a sixth magnetic ring comprising sixth magnetic pole-pairs disposed evenly along the sixth magnet ring;

wherein each of the fifth magnetic pole-pairs and the sixth magnetic pole-pairs comprises two opposing magnets, wherein the number of the fifth magnetic pole-pairs is the same as the number of the third magnetic pole-pairs, and the number of the sixth magnetic pole-pairs is the same as the number of the second magnetic pole-pairs; and wherein the magnetic rings are arranged in an alternating manner according to the number of magnetic pole-pairs comprised in the respective magnet rings.

15. A motor comprising a magnetic gear assembly according to claim 14.

16. A motor comprising a magnetic gear assembly according to claim 1.

17. A wind turbine including a magnetic gear assembly according to claim 1, wherein the fourth ring is connected to one end of a shaft in the wind turbine, and the other end of the shaft is connected to rotor blades of the wind turbine.

18. An electrical generator comprising:

a magnetic gear assembly, comprising:

a first magnet ring comprising first magnetic pole-pairs disposed evenly along the first magnet ring;

a second magnet ring comprising second magnetic pole-pairs disposed evenly along the second magnet ring;

a third magnet ring comprising third magnetic pole-pairs disposed evenly along the third magnet ring, wherein each of the first magnetic pole-pairs, the second magnetic pole-pairs, and the third magnetic pole-pairs comprises two opposing magnets; and a fourth ring comprising ferromagnetic pieces disposed evenly along the fourth ring, wherein the first magnet ring, the second magnet ring, the third magnet ring, and the fourth ring are arranged along an axis, wherein the first magnet ring and the second magnet ring are positioned on either side of the third magnet ring along the axis, wherein magnetic flux generated by the third magnet ring is distributed between the first magnet ring and the second magnet ring during operation of the magnetic gear assembly, and wherein the first magnet ring and the second magnet ring are fixed with respect to the axis, and a plurality of stator windings affixed outside the third magnet ring.

19. A magnetic gear assembly, comprising:

a first magnet ring comprising first magnetic pole-pairs disposed evenly along the first magnet ring;

a second magnet ring comprising second magnetic pole-pairs disposed evenly along the second magnet ring;

a third magnet ring comprising third magnetic pole-pairs disposed evenly along the third magnet ring, wherein each of the first magnetic pole-pairs, the second magnetic pole-pairs, and the third magnetic pole-pairs comprises two opposing magnets; and a fourth ring comprising ferromagnetic pieces disposed evenly along the fourth ring, wherein the first magnet ring, the second magnet ring, the third magnet ring, and the fourth ring are arranged along an axis, wherein the first magnet ring and the second magnet ring are positioned on either side of the third magnet ring along the axis, wherein magnetic flux generated by the third magnet ring is distributed between the first magnet ring and the second magnet ring during operation of the magnetic gear assembly, and wherein the third magnet ring and the fourth ring are arranged coaxially with respect to the axis, and the fourth ring is greater in axial length than the third magnet ring.

20. The magnetic gear assembly according to claim 19, wherein the number of the first magnetic pole-pairs is the same as the number of the second magnetic pole-pairs, and wherein the number of third magnetic pole-pairs differs from the number of the first magnetic pole-pairs and the number of the second magnetic pole-pairs.

* * * * *